United States Patent
Lan et al.

(10) Patent No.: US 8,285,315 B1
(45) Date of Patent: Oct. 9, 2012

(54) METHODS FOR USER-INTERFACE OVER SMS MESSAGES BASED ON A ROLLING SEQUENCE MODEL

(75) Inventors: Divon Lan, Tel Aviv (IL); Natalia Marmasse, Ichud (IL); Mark Grossmann, Rishon Lezion (IL); Shai Gutner, Modi'in (IL); Michal Maor, Mazor (IL); Dror Marcus, Tel Aviv (IL); Tal Franji, Hod HaSharon (IL)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/152,197

(22) Filed: Jun. 2, 2011

(51) Int. Cl.
*H04W 4/00* (2009.01)
(52) U.S. Cl. ............... 455/466; 455/414.1; 455/411; 455/412.2; 370/351; 370/388
(58) Field of Classification Search .......... 455/410, 455/411, 418–420, 466, 414.1, 404.1
See application file for complete search history.

(56) References Cited

U.S. PATENT DOCUMENTS

| | | | |
|---|---|---|---|
| 2008/0188207 A1* | 8/2008 | Lee | 455/414.1 |
| 2008/0254815 A1* | 10/2008 | Murphy et al. | 455/466 |
| 2009/0036149 A1* | 2/2009 | Liu et al. | 455/466 |
| 2009/0197579 A1* | 8/2009 | Celik | 455/414.1 |
| 2010/0279716 A1* | 11/2010 | Benco et al. | 455/466 |

OTHER PUBLICATIONS

Example of Applications of SMS Messaging, retrieved from <http://www.developershome.com/sms/sms_tutorial.asp?page=egApps>, Sep. 2011.
nexsites Interactive SMS, nexmedia, retrieved from <http://nexmedia.com.sg/nexsites-components/nexsites-interactive-sms.html>, Sep. 2011.
Mobile/SMS Solutions, Smash, retrieved from <http://www.smashcode.com/solutions>, Sep. 2011.
The Mobile Application Server, Smash, retrieved from <http://www.smashcode.com/node/117>, Apr. 2009.
Uses, Smash, retrieved from <http://www.smashcode.com/products/uses>, Sep. 2011.
Schedule Summary for the Hands-on Labs, BOFs, and Sessions, JavaOne, <http://java.sun.com/javaone/sf/2008/schedule_detail.jsp>, Jun. 2009.
TS-5584 Building Interactive Mobile Messaging (Short Message Service) Applications, Technical Session, Michael Juntao Yuan, eZee Inc., May 9, 2008, Moscone Center—Hall E 133.

* cited by examiner

*Primary Examiner* — Marcos Batista
*Assistant Examiner* — Keith Fang
(74) *Attorney, Agent, or Firm* — McDermott Will & Emery LLP

(57) ABSTRACT

Configurations providing a rolling sequence model for a user interface over SMS for an interactive system are described. An SMS server can implement the rolling sequence model in which a number from a sequence of numbers (e.g., a block of numbers) is assigned to a user session. A subsequent number from the sequence of numbers is assigned for each session turn-around. Upon receipt of an SMS message from a user to initiate a session, the SMS server assigns a first number from the sequence of numbers to a user session. The SMS server then assigns the next phone number to the user session after receiving a subsequent SMS message from the user. In the event that the last number from the sequence of numbers is assigned, the SMS can cycle through the sequence of numbers by assigning the first number to the user session.

8 Claims, 9 Drawing Sheets

Stage 310

Stage 320

Stage 510

Stage 520

Stage 530

METHODS FOR USER-INTERFACE OVER SMS MESSAGES BASED ON A ROLLING SEQUENCE MODEL

BACKGROUND

In particular geographical areas in which wireless Internet/broadband infrastructure is not prevalent or insufficient, a Short Message Service (SMS) can be utilized to enable communication via wireless mobile devices. However, current SMS implementations impose limited functionality for accessing different levels of an interactive system because of inherent limitations with SMS. Some implementations may require users to remember complex and non-intuitive command line syntax in order to communicate over SMS. Additionally, because of the stateless nature of SMS, tracking the context in which a respective SMS message is interacting with the system is problematic because the user may switch between different commands/options in the system.

Moreover, the delivery of an SMS message is not guaranteed, let alone, to be delivered according to an expected order or sequence. Therefore, SMS implementations may result in delayed or lost SMS delivery that introduces problems in providing interactive user interfaces.

SUMMARY

The subject technology provides for providing a user-interface over a Short Message Service (SMS) to enable functionality in an interactive system. One aspect receives a first SMS message from a user to initiate a user session. A first phone number from a sequence of phone numbers is assigned to the user session. A second SMS message is transmitted from the first phone number to the user in response to the first SMS message. The second SMS message can includes a set of options corresponding to a level within the interactive system. A third SMS message can be received from the user. The third SMS message can includes a selected option from the second SMS message. A next phone number from the sequence of phone numbers is assigned for responding to the third SMS message. A fourth SMS message is the transmitted from the next phone number to the user in response to the third SMS message.

Another aspect of the subject technology provides a system for providing a user-interface over a Short Message Service (SMS) to enable functionality in an interactive system. The system includes an SMS front-end server configured to provide one or more modules to perform different functionality. The SMS front-end server includes a reception module configured to receive a first SMS message from a communication device to initiate a user session to a service. The SMS front-end server includes a session module configured to provide an interactive interface over SMS to the service by assigning a first number from a sequence of phone numbers to the user session. The SMS front-end server further includes a transmission module configured to transmit a second SMS message over the first number in response to the first SMS message. The reception module is further configured to receive a third SMS message over the first number. The session module is further configured to select a second number from the sequence to assign to the user session for responding to the third SMS message. In one aspect, the second number is subsequent to the first number in the sequence of phone numbers.

Yet another aspect of the subject technology provides for receiving a first SMS message from a communication device to initiate a user session. A first phone number is assigned from a sequence of phone numbers to the user session in which the user session corresponds to an interactive system. A message is received from the interactive system in which the message is in a different format than a Short Message Service (SMS) message. The received message is converted into an SMS message. The SMS message is transmitted to the communication device over the first phone number. A second SMS message is received from the communication device over the first phone number. A subsequent phone number is assigned from the sequence of phone numbers to the user session for responding to the second SMS message in which the subsequent phone number is subsequent to the first phone number.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the following figures.

DETAILED DESCRIPTION

Figure 1:
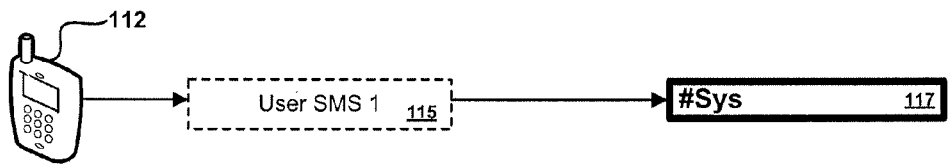
FIG. 1 conceptually illustrates a communication flow between a communication device and an SMS server utilizing a rolling sequence model.
Figure 1:
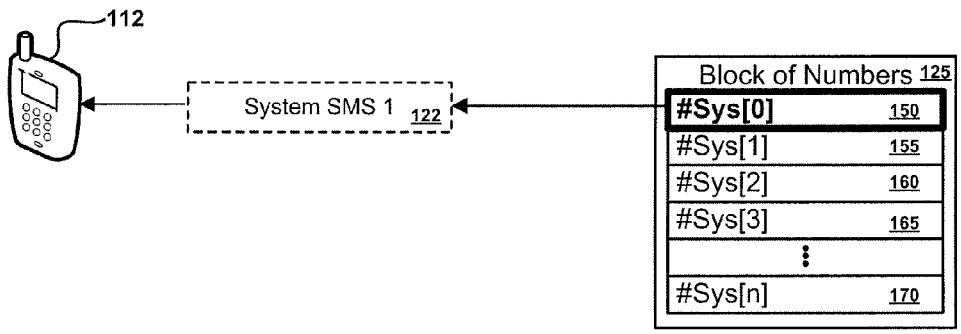
Figure 1:
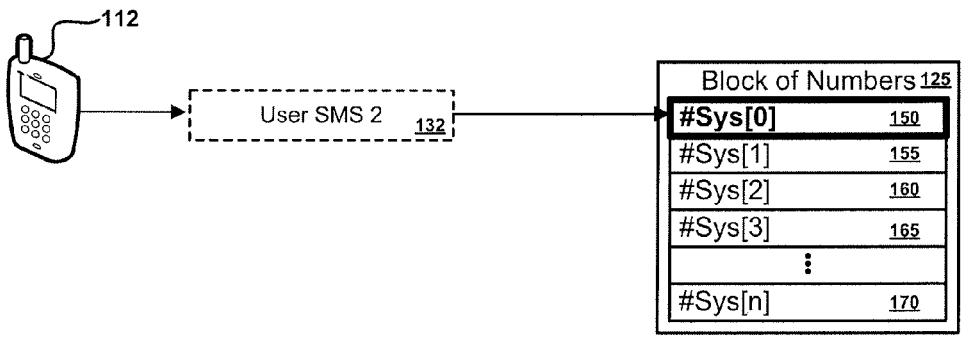
Figure 1:
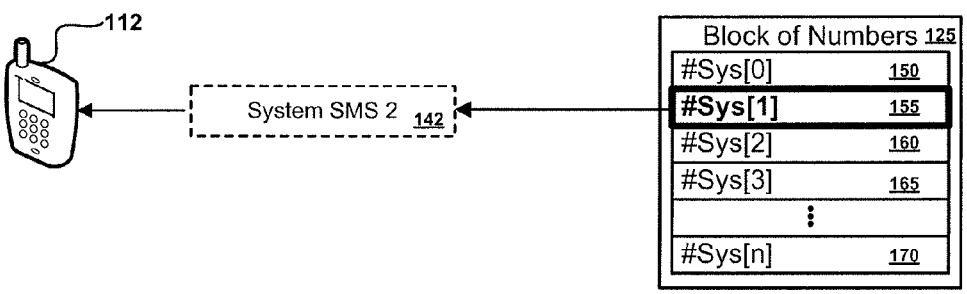

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

To enable functionality to perform more complex tasks with an interactive system, a method for providing a user-interface for an interactive system using SMS based on a rolling sequence model is described. In some implementations, the method uses a block of phone numbers to send and receive SMS messages. By utilizing the block of phone numbers, the method provides complex user interactions such as menu-trees, list browsing and drill-down interaction over several menu/list levels. In particular, an SMS server can implement the aforementioned method to enable complex user interactions with a user (e.g., an SMS-enabled communication device).

In a rolling sequence model, the interaction between a user and the system mimics a "ping-pong" sequence in which the user and system are exchanging SMS messages in response to one another. The user can first send an SMS message to an SMS server to initiate a user session with the system. As used herein, a user session corresponds with a series of messages that are exchanged between a user's device and the SMS server, typically for performing operations/commands within one or more interactive systems. In order to keep track of the context of user commands, the block of phone numbers is sequentially incremented for providing interaction with the system in response to each SMS message from the user. For instance, the SMS server can assign the first phone number in a sequence from the block of phone numbers to the user session. The SMS server can transmit an SMS message to the user using the first phone number in response to the first SMS message. This SMS message from the server can include a set of options corresponding to one or more different operations within a level of the interactive system.

Based on a subsequent SMS message from the user that selects a particular option, the SMS server can assign the next phone number from the sequence of numbers for responding to the user. In this manner, the SMS server can track the context of the interaction between the user and the interactive system. The SMS server can then cycle through (i.e., increment) the block of phone numbers for responding to subsequent SMS messages from the user until each of the phone numbers from the sequence has been utilized. In some instances, the SMS server can then repeat the cycling of phone numbers from the first number after reaching the last number in the sequence of the block of phone numbers.

In some instances, the SMS server can detect an out-of-order message and respond with an appropriate error message via an SMS message. In such instances, the SMS server can restart the user session with a new context (e.g., by resetting the assigned phone number to the first number in the block of phone number). In the example above after the second phone number has been assigned, if the SMS server receives a particular SMS message to a phone number different from the second phone number, the SMS server can then detect that the user has attempted to perform an expired/disallowed command.

The following description describes the interaction between a user's communication device and the aforementioned SMS server. The SMS server can provide a user interface over SMS based on a rolling sequence model in which a subsequent SMS message depends on a previous SMS message received by the SMS server.

FIG. 1 conceptually illustrates a communication flow between a communication device and an SMS server utilizing a rolling sequence model. More specifically, FIG. 1 illustrates the communication flow in different stages 110-140 between a communication device 112 and an SMS server for providing an interactive user interface over SMS. As used herein, a communication device can include, but is not limited to, a mobile device, handheld device, a personal digital assistant, a cellular phone, smartphone, tablet computer, laptop, etc.

In the first stage 110, the communication device 112 transmits an SMS message 115 to the SMS server represented by a system number 117. As shown, the system number 117 is represented as a single "short code" number "#Sys" that the communication device can use to transmit the SMS message 115 to initiate a user session with the SMS server. By way of example, the SMS message 115 can include a command to access a service via the SMS server, such as mail, chat, social networking, blogging, etc. Each service can represent an interactive system that provides a complex set of commands and menus (e.g., one or more different levels of menus that provide access to other commands) that are not easily provided based on the limitations of SMS.

The SMS server manages a block of numbers 125 which is used to implement the rolling sequence model for providing a user interface over SMS. As illustrated, the block of numbers 125 includes a sequence of phone numbers 150-170. In some configurations, the SMS server utilizes an index (e.g., 0 to n where 0 represents the first number and n is the last number) to access a particular phone number in the sequence of phone numbers. In the second stage 120, after receiving the SMS message 115 from the first stage 110, the SMS server assigns a first phone number 150 (as indicated in bold), which is designated by an index value of 0 (i.e., #Sys[0]), to the user session. The SMS server then transmits an SMS message 122 over the first phone number 150 in response to the SMS message 115 from the first stage 110.

In some configurations, the SMS message 122 includes a set of options corresponding to a level within an interactive system. As used herein, a level can be understood as a menu level within a user interface. For a given command included in the SMS message from the communication device 112, the SMS server can provide a set of options responsive to that command. In an example in which the initial SMS message from the communication device 112 includes a command for accessing a mail service, the SMS server can transmit a subsequent SMS message including one or more options for the mail service (e.g., send mail, browse mail, browse contacts, etc.) to the communication device 112.

In the third stage 130, the communication device 112 transmits an SMS message 132 over the first phone number 150 to the SMS server. The SMS message 132 includes a selected option corresponding to one of the options provided in the SMS message 122 from the second stage 120. Responsive to the selected option, the SMS server can then assign a subsequent number to the first phone number from the block of numbers 125 to implement the rolling sequence model for providing a user interface over SMS.

In the fourth stage 140, the SMS server assigns a next phone number from the block of numbers 125. For instance, the SMS server can determine the current assigned phone number from the block of numbers 125 and then select the next (i.e., subsequent) number to assign to the user session. As shown, the SMS server assigns a second phone number 155, which is the next phone number from the first phone number 150 previously assigned to the user session (e.g., from the second and third stages 120 and 130). The second phone number is designated by an index value of 1 (i.e., #Sys[1]).

As further shown in the fourth stage 140, the SMS server transmits an SMS message 142 over the second phone number 155. The SMS message 142 includes a response to the selected option in the SMS message 132 from the third stage 130. By transmitting the SMS message 142 over the second phone number 155, the SMS server implements the rolling sequence model in which the next phone number is subsequently assigned to the user session in response to an SMS message from the communication device for that user session. The SMS server can then cycle through each of the numbers from the block of numbers during the user session for each reception/transmission of related SMS messages called a session turn-around.

Although FIG. 1 illustrates an example for utilizing one sequence of phone numbers (e.g., one block of numbers) for managing a single user session, one of ordinary skill in the art would appreciate that several sequences of phone numbers (e.g., different blocks of numbers) could be utilized to manage multiple user sessions, respectively. In an example in which multiple user sessions are present, the SMS server can employ the rolling sequence model described above for several sequences of phone numbers corresponding to different user sessions.

Figure 2:
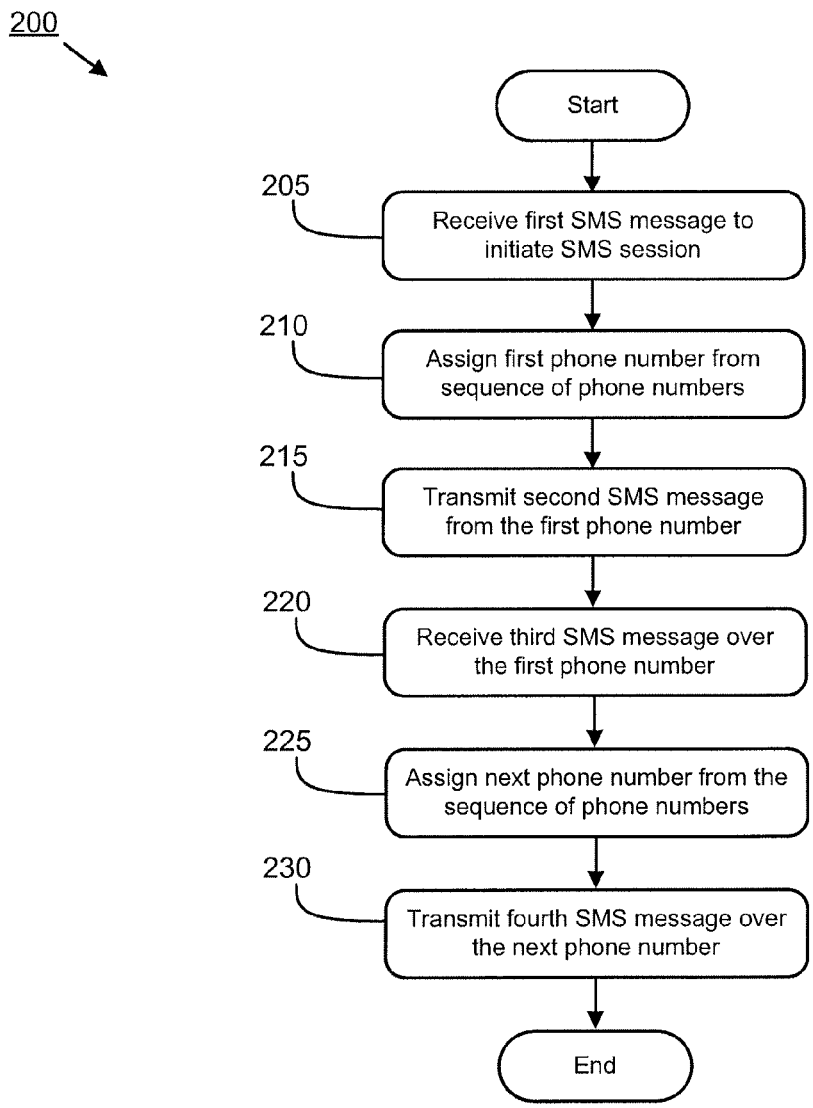
FIG. 2 conceptually illustrates an exemplary process for implementing a rolling sequence model for providing a user interface over SMS.

The following discussion describes an exemplary process for implementing the rolling sequence model for providing a user interface over SMS as described above. The aforementioned SMS server of some configurations can implement such a process described in further detail below. FIG. 2 conceptually illustrates an exemplary process 200 for implementing a rolling sequence model for providing a user interface over SMS. FIG. 2 will be described below by reference to relevant portions of FIG. 1.

The process 200 begins when a first SMS message is received at 205 to initiate an SMS session. Referring to FIG. 1, the communication device 112 transmits the SMS message 115 to initiate the SMS session that is received by the SMS server (represented by the system number 117). In some configurations, the SMS server receives the first SMS message over a system number as shown in the first stage 110 of FIG. 1. The system number of some configurations can be an access number (e.g., a sequence of digits) in which the communication device (i.e., the user) can transmit the first SMS message to access one of the services provided over SMS by the SMS server. By way of example, the process 200 can receive the first SMS message that includes a text string corresponding to a command (e.g., mail, chat, blog, etc.) that activates a particular service.

At 210, the process 200 assigns a first number from a sequence of phone numbers in response to the first SMS message to initiate the user session. In the rolling sequence model, the SMS server of some configurations assigns the first phone number from the block of numbers managed by the SMS server. By reference to FIG. 1, the SMS server assigns the first number 150 (i.e., #Sys[0]) from the block of numbers 125 in the second stage 120.

In response to the aforementioned first SMS message, the process 200 at 215 transmits a second SMS message from the first phone number (i.e., the currently assigned number to the user session). The second SMS message of some configurations includes a set of options corresponding to a level within an interactive system. The interactive system of some configurations can provide a service (e.g., mail, chat, social network, blog, etc.) that is typically not accessible over SMS.

Referring to FIG. 1, the SMS server transmit the SMS message 122 that can include the aforementioned set of options in the second stage 120.

After transmitting the second SMS message over the first phone number, the process 200 at 220 can receive a third SMS message over the first phone number. In some configurations, the third SMS message includes a selected option from the aforementioned set of options in the second SMS message. The process 200 can perform a corresponding operation within the interactive system based on the selected option in the third SMS message. For instance, in the example in which the user's communication device is accessing a mail interactive system (e.g., for reading, composing and managing e-mail), the selected option can correspond with a command to send a message, browse messages, browse contacts, etc., or can correspond with a menu level within the interactive system. Referring to FIG. 1, the SMS server can receive the SMS message 132 with the selected option from the communication device 112 in the third stage 130.

Next, the process 200 at 225 assigns the next phone number from the sequence of phone numbers. In some configurations, the process 200 assigns a subsequent phone number from the sequence of phone numbers to the user session. In particular, the subsequent phone number is subsequent to a currently assigned phone number to the user session. In this example, the process 200 assigns the second phone number from the sequence of phone numbers. By reference to FIG. 1, the SMS server assigns the second phone number 155 from the block of numbers 125 in the fourth stage 140.

The process at 230 then transmits a fourth SMS message over the next phone number (e.g., the second phone number from the block of phone numbers). The fourth SMS message transmitted by the SMS server can be responsive to the selected option from third message. For instance, the SMS server can perform a corresponding operation within the interactive system based on the selected option in the third SMS message, and then transmit the fourth SMS message based on the result of the operation. In an example where the selected operation corresponds with a menu level in the interactive system, the fourth SMS message can include a set of commands from the menu level. After transmitting the fourth SMS message the process then ends.

Although the process 200 described above assigns the next phone number (i.e., the second phone number) to the user session for implementing the rolling sequence model, one of ordinary skill in the art would appreciate that the process 200 can repeat similar operations from 220-230 for receiving a subsequent SMS message, assigning a subsequent phone number, and then transmitting a further SMS message over the subsequent phone number. These repeated steps are not shown in FIG. 2 for the sake of simplicity and to not obscure the description of the process 200 with repetitious disclosure. In this manner, the process 200 can cycle through the sequence of phone numbers to provide the user interface over SMS based on the rolling sequence model.

Figure 3:
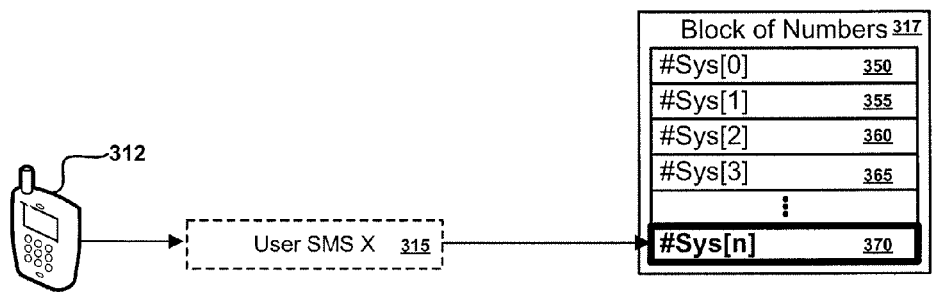
FIG. 3 conceptually illustrates an exemplary communication flow between an SMS server and user for assigning a first phone number from a block of phone numbers after a user session is currently assigned a last phone number from the block of phone numbers.
Figure 3:
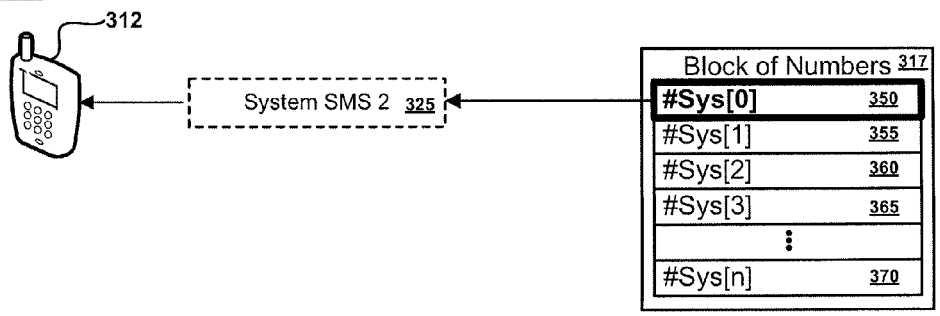

As mentioned above, the SMS server can cycle through the sequence of phone numbers to the user session. Given that the sequence of phone numbers is a finite block of numbers, the SMS server can be configured to re-utilize the sequence of phone number after the last number has been assigned to the user session. FIG. 3 conceptually illustrates an exemplary communication flow between the SMS server and user for assigning a first phone number from the block of phone numbers after a user session is currently assigned to a last phone number from the block of phone numbers. As shown, FIG. 3 illustrates a communication flow in two stages 310 and 320 between a communication device 312 and an SMS server managing a block of numbers 317, which includes first to nth phone numbers 350-370. The SMS server manages the block of numbers 317 in order to provide a user interface over SMS based on the rolling sequence model.

In the first stage 310, the SMS server receives an SMS message 315 over the last phone number from the communication device 312. In the example shown in FIG. 3, a current user session is assigned to the last phone number 370. The last phone number is assigned an index value of n (i.e, #Sys[n]). In the rolling sequence model, once the last phone number from the sequence of phone numbers has been assigned, the SMS server can then cycle back to the first phone number in the block of numbers 317 for a subsequent number assignment.

As shown in the second stage 320, the SMS server assigns a first phone number 350 from the block of numbers 317. The first phone number 350 is assigned an index value of 0 (i.e., #Sys[0]). The SMS server can then perform a corresponding operation(s) in response to the incoming SMS message 315 from the first stage 312. The SMS server then transmits an SMS message 325 based on the result of the operation over the first phone number to the communication device 312.

Figure 4:
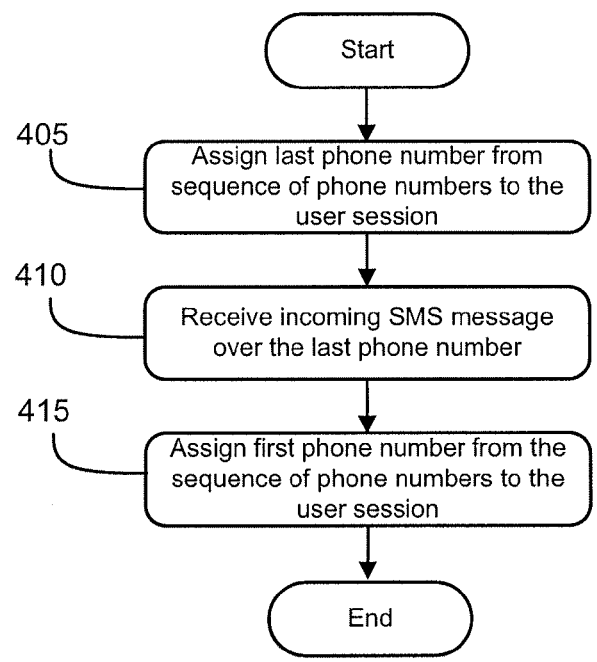
FIG. 4 conceptually illustrates an exemplary process for cycling a sequence of phone numbers.

The following discussion describes an exemplary process for cycling a sequence of phone numbers after a last phone number is currently assigned to a user session. The SMS server of some configurations can implement such a process described in further detail below. FIG. 4 conceptually illustrates an exemplary process 400 for cycling a sequence of phone numbers. FIG. 4 will be described below by reference to relevant portions of FIG. 3.

The process 400 begins when a last phone number from a sequence of phone numbers is assigned to a user session. In some configurations, the process 400 assigns the last phone number after a penultimate phone number from the sequence of phone numbers is assigned to the user session. In an example in which the sequence of phone numbers includes a total of n numbers (where n is a non-zero integer value), the process assigns the nth phone number after a n−1 phone number is currently assigned to the user session.

At 410, the process 400 receives an incoming SMS message over the last phone number. The incoming SMS message can be received from the user's communication device. Referring to FIG. 3, the SMS server receives the SMS message 315 over the last phone number 365 from the communication device 312 in the first stage 310. Responsive to the incoming SMS message, the process 400 can perform an operation within an interactive system. For instance, the process 400 can perform a selected option included in the incoming SMS message corresponding to a command or operation(s) in the interactive system.

Based on the result of operation in the interactive system, the process 400 at 415 can subsequently assign a first phone number from the sequence of phone numbers to the user session. Given that the sequence of phone numbers includes a finite amount of numbers, the process 400 can cycle through the sequence of phone numbers and re-iterate through the sequence in order to implement the rolling sequence model. By reference to FIG. 3, the SMS server assigns the first phone number 350 from the block of numbers 317 to the user session in the second stage 320. The process 400 then ends.

The SMS server can utilize the process 400 described above in FIG. 4 in conjunction with the process 200 described in FIG. 2. For example, after the process 400 assigns the first number to the user session at 415, the SMS server can perform the operations from 215-230 from the process 200 to implement the rolling sequence model for providing a user interface over SMS for the interactive system.

Figure 5:
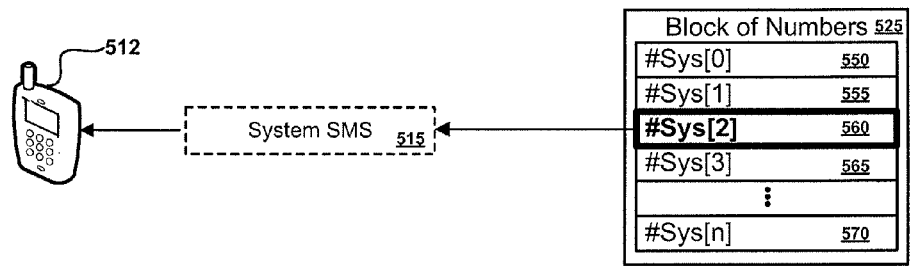
FIG. 5 conceptually illustrates an exemplary communication flow between an SMS server and user when an out-of-order SMS is received.
Figure 5:
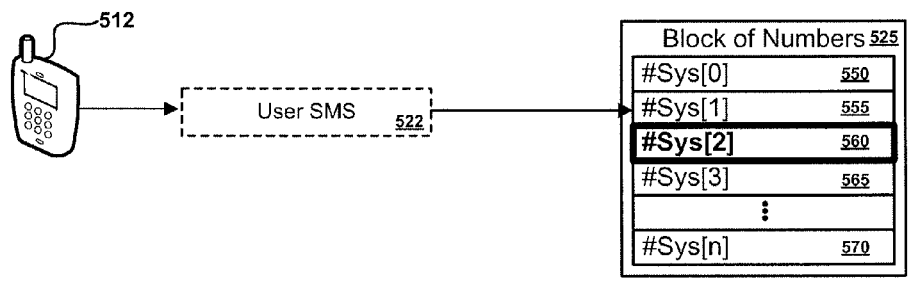
Figure 5:
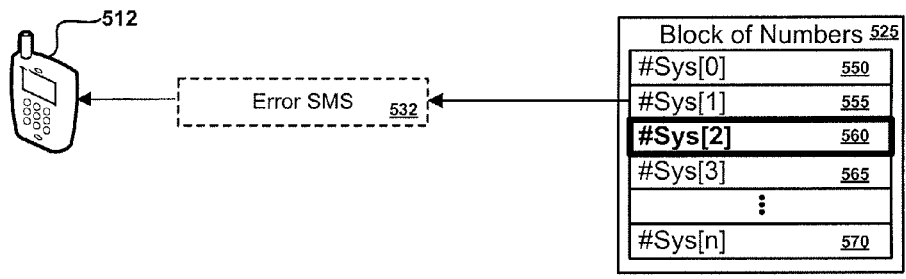

In some instances, the SMS server can receive an invalid SMS message or an out-of-order message and respond with an error. In the rolling sequence model, the SMS server expects an SMS message over a particular phone number depending on a previous interaction with the user's communication device. From a usability standpoint, the user is required in the rolling sequence model to submit an SMS message to the phone number assigned to the user session based on the sequential manner in which the number is assigned. To improve the robustness of the SMS server and to ensure the consistency of the user session, the SMS server of some embodiments can detect an out-of-order SMS message upon receipt and transmit an SMS message indicating an error accordingly. FIG. 5 conceptually illustrates an exemplary communication flow between the SMS server and user when an out-of-order SMS is received. As shown, FIG. 5 illustrates a communication flow in three stages 510-530 between a communication device 512 and an SMS server managing a block of numbers 525, which includes first to nth phone numbers 550-570.

In the first stage 510, the user session is currently assigned to a third phone number 560 (as indicated by #Sys[2]) from the block of numbers 525. The SMS server transmits an SMS message 515 to the communication device 512. In the event that the communication device (i.e., the user) subsequently submits an SMS message using a different phone number from the currently assigned phone number to the user session, the SMS server can detect an out-of-order SMS message and respond accordingly.

As shown in the second stage 520, the communication device 512 transmits an SMS message 522 over the second phone number 555. The SMS server of some configurations detects that the second phone number is not the currently assigned number to the user session (i.e., not the third phone number 560 as indicated in bold).

Although the second stage 520 illustrates that the out-of-order SMS message is transmitted over the second phone number 555, one of ordinary skill in the art can realize that the SMS server is capable of detecting the out-of-order SMS message so long as the SMS message is received over a different phone number than the currently assigned number to the user session.

To alert the user of an error, the SMS server in the third stage 530 transmits an SMS message 532 indicating the error over the second phone number 555. The SMS server, for example, can include a text string to indicate the error. In turn, after the communication device 512 receives the SMS message 532, the user can be notified of the error. In other words, the user can then realize that the previously sent SMS message 522 from the second stage 520 was not sent to the current assigned number to the user session.

Figure 6:
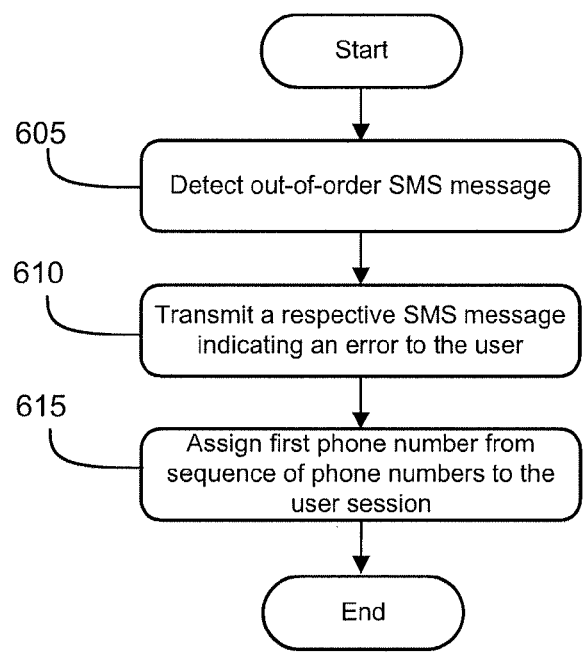
FIG. 6 conceptually illustrates an exemplary process for detecting an out-of-order SMS message.

The following description describes an exemplary process for detecting an out-of-order SMS message from the user and responding to alert the user of the error. The SMS server of some configurations can implement such a process for ensuring the consistency of the user session in the rolling sequence model. FIG. 6 conceptually illustrates an exemplary process 600 for detecting an out-of-order SMS message. More specifically, the process 600 detects the out-of-order SMS message based on an expected sequence for the rolling sequence model and handles the error so that the user session can be consistent with the rolling sequence model. FIG. 6 will be described by reference to portions of FIG. 5.

The process 600 begins at 605 by detecting an out-of-order SMS message. In some configurations, the process 600 can detect the out-of-order SMS message receiving a respective SMS message over a different phone number than an assigned phone number to the user session. For example, the process 600 can determine the currently assigned phone number to the user session. In the event that a subsequent SMS message is received over a different phone number than the assigned number to the session, the process 600 can detect that the SMS message is out-of-order. Referring to FIG. 5, the SMS server can detect the out-of-order SMS message in the second stage 520 state if the SMS message 522 is received over a different phone number (i.e., the second phone number 555) than the currently assigned number to the user session (i.e., the third phone number 560).

Alternatively or conjunctively, the process 600 detects the out-of-order SMS message by receiving a respective SMS message with an invalid command. The process 600 can determine that the command is invalid based on a previous SMS message transmitted to the user. For instance, if the previous SMS message included a set of options and the subsequently received SMS message from the user did not include a corresponding option, then the process 600 can determine that the received SMS message is out-of-order from the expected sequence.

At 610, the process 600 transmits a respective SMS message indicating an error to the user. The SMS message indicating the error can include a text string such as, "Error— message expired!" One of ordinary skill the art would appreciate that any suitable text string could be utilized to indicate the error. In some configurations, the process 600 transmits the SMS message indicating the error over the phone number that the out-of-order SMS message was received. Thus, the user will receive the SMS message indicating the error from the phone number that out-of-order SMS message was sent. With reference to FIG. 5, the SMS server in the third stage 530 transmits the SMS message 532 indicating the error to the user's communication device 512.

The process 600 of some configurations can reset the user session after transmitting the SMS message indicating the error. In particular, the process 600 at 615 can assign a first phone number from the sequence of phone numbers that resets the user session. By assigning the user session to the first phone number, the process can initiate a clean context for implementing the rolling sequence model for the user interface over SMS. The process 600 of some configurations can then optionally transmit an SMS message over the first phone number to notify the user that the user's session has been reset. The process 600 then ends.

The SMS server can utilize the process 600 described above in FIG. 6 in conjunction with the process 200 described in connection with FIG. 2. For example, after the process 600 assigns the first number to the user session at 615, the SMS server can perform the operations from 215-230 from the process 200 to implement the rolling sequence model for providing a user interface over SMS for the interactive system.

Given that an interactive system can natively process messages and data in a format different than the SMS message format and therefore not configured to handle SMS messages, one aspect of the subject technology provides for converting an SMS message into a compatible format for the interactive system. The SMS server can receive an incoming SMS message from a communication device. The SMS message can include a selected option or command for the interactive system. In example in which the interactive system is an e-mail service, the SMS server can convert the SMS message into a compatible format (e.g., RFC 5322 format) for processing by the e-mail service. Conjunctively, the SMS server can also convert a message received from the interactive service into SMS message format for transmitting to the communication device.

Figure 7:
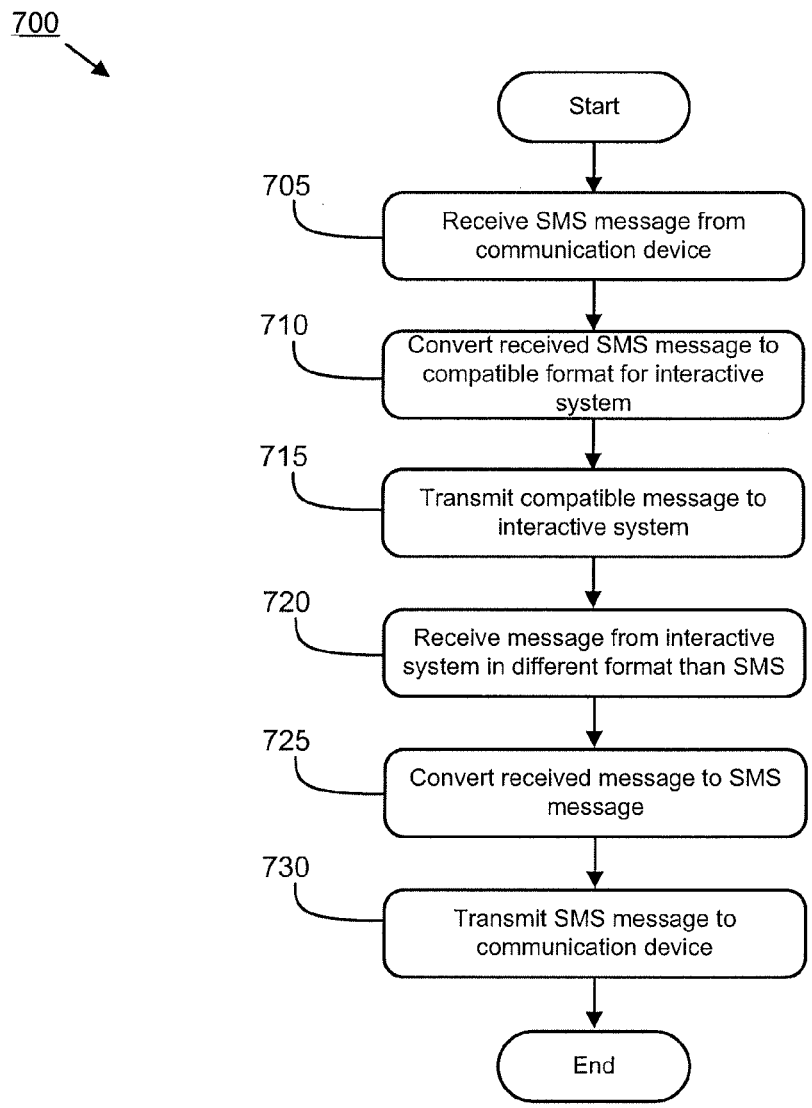
FIG. 7 conceptually illustrates an exemplary process for converting an SMS message to a compatible format for an interactive system.

The following discussion describes an exemplary process that can be implemented by an SMS server to convert SMS messages from a user (i.e., a communication device) and messages received from an interactive system to facilitate a message flow between the communication device and interactive system. FIG. 7 conceptually illustrates an exemplary process 700 for converting an SMS message to a compatible format for an interactive system. In particular, FIG. 7 illustrates a request-response communication flow in which the process 700 converts an incoming SMS message (e.g., from the communication device) for transmission to the interactive system, and converts an incoming message from the interactive system in response for transmission to the communication device. The process 700 of some configurations can be performed conjunctively with the processes 200, 400 and/or 600 described above in FIGS. 2, 4 and 6 for providing a rolling sequence model for interacting with the interactive system.

The process 700 begins at 705 when an SMS message is received from a communication device. For example, the process 700 can receive the SMS message over a phone number (e.g., a first phone number) assigned to a user session or over a system number (i.e., #Sys) before a phone number is assigned to the user session. In some configurations, the SMS message can include a command to access a service provided by the interactive system or include a selected option from a level of the interactive system.

At 710, the process 700 converts the received SMS message to a compatible format for the interactive system. In particular, the interactive system may process data and/or messages in a different format that is incompatible with the SMS message format. The process 700 therefore converts the SMS message to enable the interactive system to process the included command or selected option from the SMS message. For example, the process 700 can convert the SMS message data into the compatible format by performing a data transformation. In some configurations, the process 700 can extract alphanumerical data corresponding to the command or selected option from the SMS message and subsequently include the extracted data in the compatible message. The process 700 at 715 then transmits the compatible message to the interactive system.

After executing an operation in response to the compatible message, the interactive system of some configurations can transmit a message to the SMS server in response. At 720, the process 700 receives a message in a different format than the SMS message format from the interactive system. The message from the interactive system can include the results of executing the selected option from a level in the interactive system or include a set of options from the level. The process 700 at 725 then converts the received message into the SMS message format for transmission to the communication device. At 730, the process 700 transmits the SMS message to the communication device. The process 700 then ends.

The above described operations in FIG. 7 illustrate an example of a single request-response communication flow between the communication device and the interactive system for converting messages. However, one of ordinary skill in the art would understand that the process 700 could be repeatedly performed for more than one request-response communication flow. For example, in the rolling sequence model, the SMS server can assign a subsequent number from the currently assigned number to the user session. It should be understood that the process 700 can then perform the operations in FIG. 7 for messages that are received and transmitted over the subsequent number assigned to the user session.

The following section describes an exemplary computing environment including an SMS server that can implement the above described processes as a computer program running on a particular machine, such as a computer, or stored as instructions in a computer readable medium.

Figure 8:
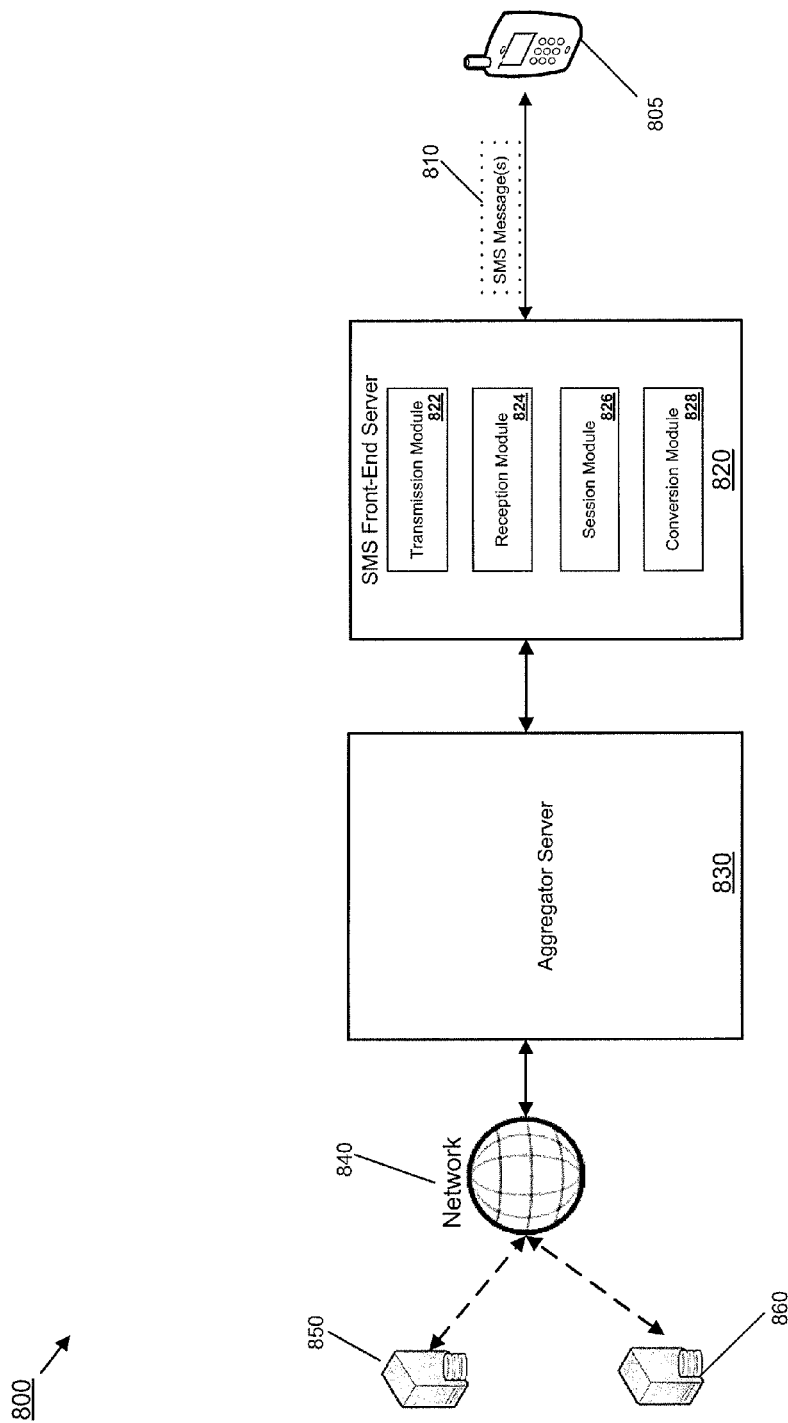
FIG. 8 conceptually illustrates an exemplary computing environment including an SMS server of some configurations.

FIG. 8 conceptually illustrates an exemplary computing environment 800 including an SMS server of some configurations. In particular, FIG. 8 shows an SMS front-end server 820 for implementing the above described processes in FIGS. 2, 4, 6 and 7 that manage a sequence of phone numbers for providing a user interface over SMS to an interactive service. In some configurations, the SMS front-end server 820 is part of a server-based implementation running a particular machine connected to a network.

The SMS front-end server 820 of some configurations includes different modules for providing different functionality. As illustrated in FIG. 8, the SMS front-end server 820 includes a transmission module 822 configured to transmit SMS messages, a reception module 824 configured to receive SMS messages, a session module 826 configured to manage a sequence of numbers, and a conversion module 828 configured to convert non-SMS messages to SMS messages and vice versa. To implement the rolling sequence model, the SMS front-end server 820 includes the session module 826 that initially assigns a first number from a sequence of numbers to a user session (e.g., after the reception module 824 receives an SMS message to initiate a user session from a communication device). The SMS front-end server 820 further includes the transmission module 822 that transmits a response SMS message to the communication device over the assigned number. The session module 826 of the SMS front-end server 820 can then assign a subsequent number (e.g., from the currently assigned number) to the user session for a subsequent request-response communication flow between the communication device and the SMS front-end server 820.

As shown, the computer environment 800 includes a communication device 805, the SMS front-end server 820, an aggregator server 830, a network 840, and interactive service servers 850 and 860. The SMS front-end server 820 and the communication device 805 can engage in a two-way communication flow for providing a user interface to an interactive system over SMS as described above in FIGS. 1, 3 and 5 and the processes in FIGS. 2, 4, 6 and 7. For instance, the reception module 824 of the SMS front-end server 820 can receive one or more SMS message(s) 810 that includes a selected option (e.g., from a level in the interactive service) or a command for executing by the interactive service from the communication device 805. Similarly, the transmission module 822 of the SMS front-end server 820 can also transmit one or more SMS message(s) 810 to the communication device 805 that includes a response to the selected option or command from the interactive service. The conversion module 828 of SMS front-end server 820 can convert any received SMS message 810 to a compatible format for transmitting to the aggregator server 830.

The SMS front-end server 820 communicates with the aggregator server 830 to provide the user interface over SMS for one or more interactive service servers. In some configurations, the aggregator server could be located in the same location as the SMS front-end server 820 (e.g., local network) or over a remote network. The aggregator server 830 of some configurations provides an interface to one or more different interactive service servers that provide different interactive services such as e-mail, chat, social networking, blogging, etc. In particular, the aggregator server 830 can utilize an application programming interface (API) to access the interactive service servers 850 and 860 over the network 840, which can include, but is not limited to, a local network, remote network, or an interconnected network of networks (e.g., Internet). Based on the converted SMS message(s) from the SMS front-end server 820, the aggregator server 830 can access the interactive service servers 850 and 860 using one or more API calls to perform different operations. Although two different interactive service servers are illustrated in FIG. 8, one of ordinary skill in the art would realize that the aggregator server 830 could interface with any number of different interactive servers to access different services.

The interactive service servers 850 and 860 can process the API call(s) from the aggregator server 830 and transmit a response message(s) to the aggregator server 830. A response message can include the results of executing the selected option or command corresponding to a previously submitted SMS message from the communication device 805. After receiving the response message(s), the aggregator server 830 transmits the response message(s) to the SMS front-end server 820. In some configurations, the conversion module 828 of the SMS front-end server 820 can convert the received response message(s) into an SMS format for transmitting to the communication device 805. For example, the conversion module 828 of the SMS front-end server 820 can perform a data transformation operation involving one or more different steps to convert the received response message from a corresponding interactive service server into a SMS message format.

In the exemplary computing environment 800 illustrated in FIG. 8, the SMS front-end server 820 and the aggregator server 830 are shown as separate servers. Alternatively, the SMS front-end server 820 and the aggregator server 830 could be implemented as a single server with the combined functionality of the aforementioned servers as described above. For instance, the single server (e.g., with the functionality of the SMS front-end server and the aggregator server) could receive and transmit one or more SMS messages to the communication device 810 and manage the user session using the sequence of numbers (e.g., as described by reference to FIGS. 2, 4 and 6). Additionally, the single server could convert SMS messages for transmitting to a corresponding interactive service server (e.g., interactive service servers 850 and 860). Conjunctively, the single server could receive one or more messages from the corresponding interactive service server and convert such messages into SMS format for transmission to the communication device 810.

Although FIG. 8 illustrates four exemplary modules 822-828 for performing different functionality for the SMS front-end server 820, one of ordinary skill in the art would recognize that other modules could be provided to perform other functionality for the SMS front-end server 820 and still be within the scope of the subject technology. Moreover, one of ordinary skill in the art would appreciate that, in some configurations, the functionality provided in one respective module could be combined into another module. For example, the functionality of the transmission and reception modules 822 and 824 could be combined into one module for the SMS front-end server 820.

The following section describes an exemplary system that implements aspects of the above described invention.

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software inventions can be implemented as sub-parts of a larger program while remaining distinct software inventions. In some implementations, multiple software inventions can also be implemented as separate programs. Finally, any combination of separate programs that together implement a software invention described here is within the scope of the invention. In some implementations, the software programs, when installed to operate on one or more systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 9:
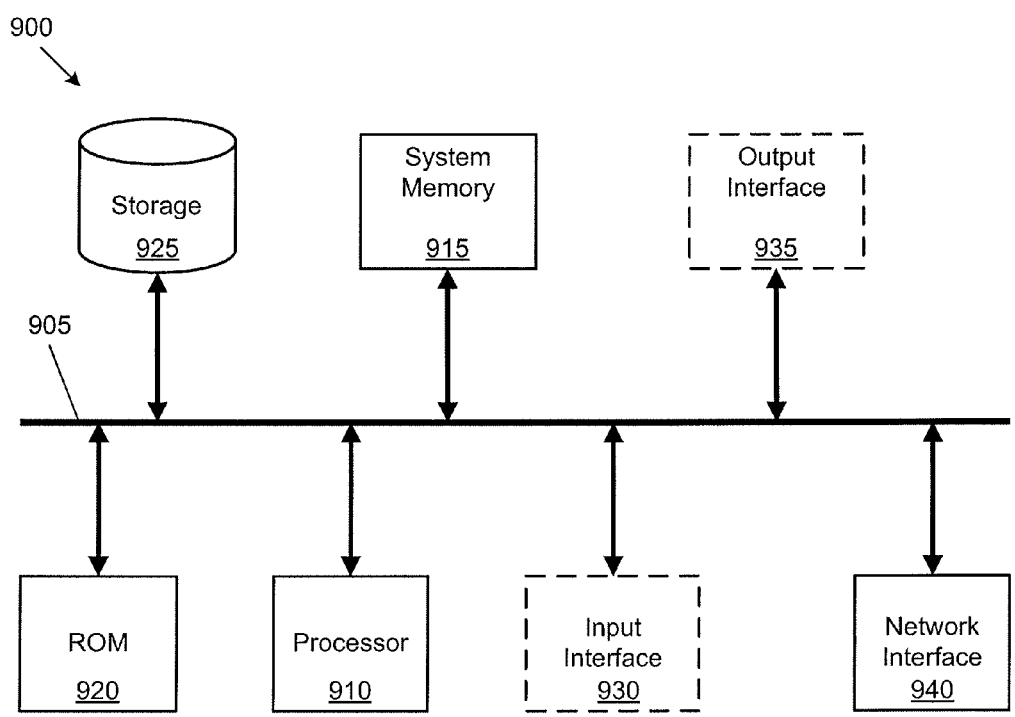
FIG. 9 conceptually illustrates a system with which some implementations of the subject technology may be implemented.

FIG. 9 conceptually illustrates a system 900 with which some implementations of the subject technology may be implemented. The system 900 can be a computer, phone, PDA, or any other sort of electronic device. Such a system includes various types of computer readable media and interfaces for various other types of computer readable media. The system 900 includes a bus 905, processing unit(s) 910, a system memory 915, a read-only memory 920, a storage device 925, an optional input interface 930, an optional output interface 935, and a network interface 940.

The bus 905 collectively represents all system, peripheral, and chipset buses that communicatively connect the numerous internal devices of the system 900. For instance, the bus 905 communicatively connects the processing unit(s) 910 with the read-only memory 920, the system memory 915, and the storage device 925.

From these various memory units, the processing unit(s) 910 retrieves instructions to execute and data to process in order to execute the processes of the invention. The processing unit(s) can be a single processor or a multi-core processor in different implementations.

The read-only-memory (ROM) 920 stores static data and instructions that are needed by the processing unit(s) 910 and other modules of the system 900. The storage device 925, on the other hand, is a read-and-write memory device. This device is a non-volatile memory unit that stores instructions and data even when the system 900 is off. Some implementations of the invention use a mass-storage device (such as a magnetic or optical disk and its corresponding disk drive) as the storage device 925.

Other implementations use a removable storage device (such as a flash drive, a floppy disk, and its corresponding disk drive) as the storage device 925. Like the storage device 925, the system memory 915 is a read-and-write memory device. However, unlike storage device 925, the system memory 915 is a volatile read-and-write memory, such a random access memory. The system memory 915 stores some of the instructions and data that the processor needs at runtime. In some implementations, the invention's processes are stored in the system memory 915, the storage device 925, and/or the read-only memory 920. For example, the various memory units include instructions for processing multimedia items in accordance with some implementations. From these various memory units, the processing unit(s) 910 retrieves instructions to execute and data to process in order to execute the processes of some implementations.

The bus 905 also connects to the optional input and output interfaces 930 and 935. The optional input interface 930 enables the user to communicate information and select commands to the system. The optional input interface 930 can interface with alphanumeric keyboards and pointing devices (also called "cursor control devices"). The optional output interface 935 can provide display images generated by the system 900. The optional output interface 935 can interface with printers and display devices, such as cathode ray tubes (CRT) or liquid crystal displays (LCD). Some implementations can interface with devices such as a touchscreen that functions as both input and output devices.

Finally, as shown in FIG. 9, bus 905 also couples system 900 to a network interface 940 through a network adapter (not shown). In this manner, the computer can be a part of a network of computers (such as a local area network ("LAN"), a wide area network ("WAN"), or an Intranet, or an interconnected network of networks, such as the Internet. Any or all components of system 900 can be used in conjunction with the invention.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for providing a user-interface over a Short Message Service (SMS) to enable functionality in an interactive system, the method comprising:
   receiving a first SMS message from a user to initiate a user session;
   assigning a first phone number from a sequence of phone numbers to the user session;
   transmitting a second SMS message from the first phone number to the user in response to the first SMS message, wherein the second SMS message includes a set of options corresponding to a level within the interactive system;

receiving a third SMS message from the user, wherein the third SMS message includes a selected option from the second SMS message;

assigning a next phone number from the sequence of phone numbers for responding to the third SMS message;

transmitting a fourth SMS message from the next phone number to the user in response to the third SMS message;

assigning a last phone number from the sequence of phone numbers to the user session;

receiving an incoming SMS message over the last phone number; and assigning the first phone number from the sequence of phone numbers to the user session in response to the incoming SMS message.

2. The method of claim 1, further comprising:

performing a corresponding operation within the interactive system based on the selected option in the third SMS message.

3. The method of claim 1, wherein the selected option comprises a menu level.

4. The method of claim 1, wherein the fourth SMS message comprises a set of commands from a menu level selected by the selected option.

5. The method of claim 1, further comprising:

detecting an out-of-order SMS message from the user; and transmitting a respective SMS message indicating an error to the user.

6. The method of claim 5, further comprising:

assigning the first phone number from the sequence of phone numbers to the user session.

7. The method of claim 5, wherein detecting the out-of-order SMS message comprises receiving a respective SMS message with an invalid command.

8. The method of claim 5, wherein detecting the out-of-order SMS message comprises receiving a respective SMS message over a different phone number than an assigned phone number to the user session.

* * * * *